No. 835,858. PATENTED NOV. 13, 1906.
A. GASPARY.
APPARATUS FOR MOLDING TILES, SLABS, AND THE LIKE OF PLASTIC MATERIAL.
APPLICATION FILED JUNE 8, 1906.
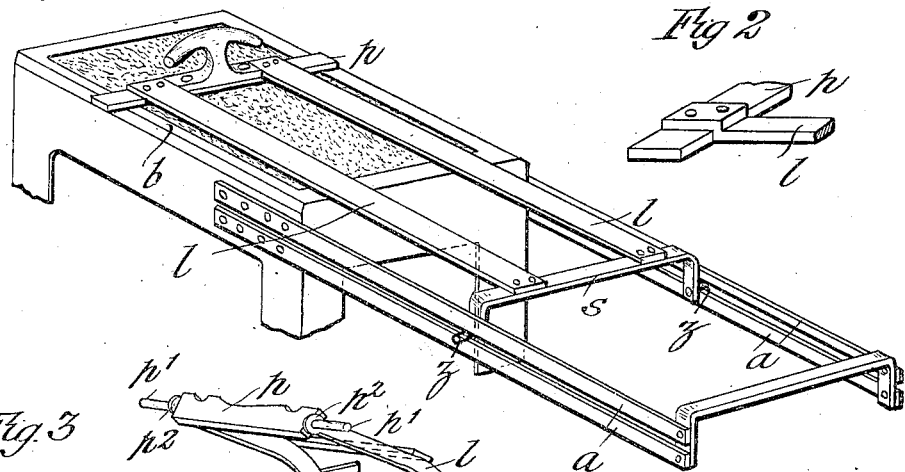
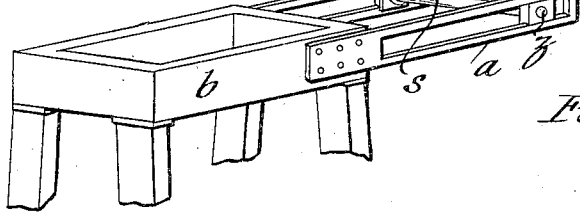
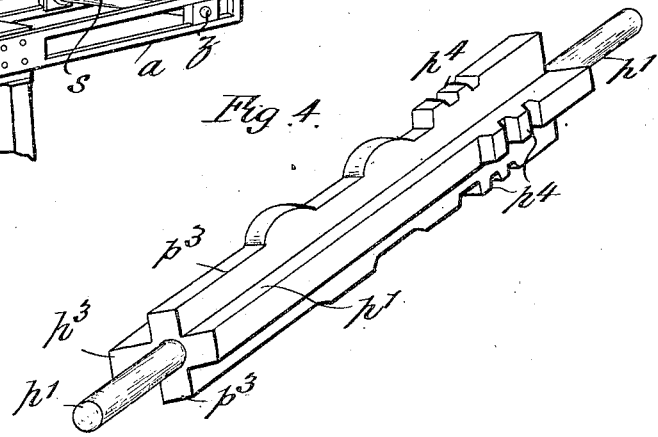
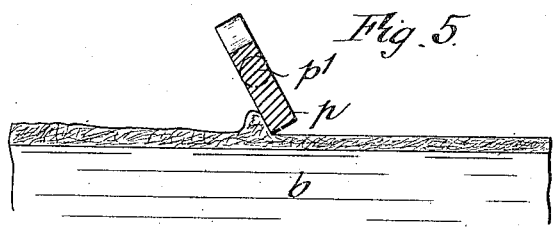
Witnesses
A. J. Haddan
S. Ford
Inventor
Alfred Gaspary
by his Attorney
R. Haddan

UNITED STATES PATENT OFFICE.

ALFRED GASPARY, OF MARKRANSTADT, NEAR LEIPSIC, GERMANY.

APPARATUS FOR MOLDING TILES, SLABS, AND THE LIKE OF PLASTIC MATERIAL.

No. 835,858.     Specification of Letters Patent.     Patented Nov. 13, 1906.

Application filed June 8, 1906. Serial No. 320,879.

*To all whom it may concern:*

Be it known that I, ALFRED GASPARY, a subject of the German Emperor, residing at Markranstadt, near Leipsic, Germany, have invented certain new and useful Improvements in Apparatus for Molding Tiles, Slabs, and the Like of Plastic Material, of which the following is a specification.

This invention relates to improvements in apparatus for molding tiles, slabs, and the like of plastic material.

In the specification of my previous patent, No. 804,944, I have described apparatus for molding profiled tiles, slabs, and the like. The present invention relates to improvements in this apparatus which enables the latter to be used with equal facility for molding plain and profiled tiles and the like. The improved apparatus also comprises a smoothing-tool or strickle connected by bars to a yoke which is pivotally supported in longitudinal guides. To allow of using the apparatus for the manufacture of smooth tiles or the like, it is essential that the connecting-bars should be located above the strickle or in the same plane as the latter, but in no case below the strickle.

In the annexed drawings, which illustrate the invention by means of examples, Figure 1 is a perspective view of the apparatus; Fig. 2, a detail view illustrating a modification; Fig. 3, a perspective view illustrating a further modification, and Figs. 4 and 5 are detail views.

$p$ designates the smoothing-tool or strickle, which is connected by bars $l$ to the yoke $s$, the latter being mounted, by means of gudgeons $z$, in lateral guides $a$, fixed to the molding-table.

The novelty of the construction shown in Fig. 1 as compared with that described in my previous patent cited lies in the fact that the bars $l$ are located above and not below the strickle $p$. The horizontal movement of the parts $p$, $l$, and $s$ produces a compression of the surface of the plastic material on the molding-table to form a flat plate or slab.

In the modification shown in Fig. 2 the connecting-bars $l$ lie in the same plane as the smoothing-tool or strickle $p$, being fixed to the upper surface thereof and bent at right angles, so that they lie in the plane of said tool.

A more suitable construction, however, is shown in Fig. 3, in which the desired condition is still fulfilled—viz., that the connecting-bars do not lie in a lower plane than the smoothing-tool. The novelty of this modification lies in the fact that the smoothing-tool may be rotated about its length axis, for which purpose the said tool is provided with a projecting gudgeon $p'$ at each end, rotatably supported in lugs or end bearings $p^2$ on the connecting-bars $l$. This smoothing-tool or strickle $p$ can therefore execute three different movements: first, a horizontal movement in conjunction with the yoke $s$; secondly, a movement in the vertical plane about the pivots $z$ of the yoke $s$, and, thirdly, a rotary movement about its longitudinal axis. The pins $p'$ also serve as handles for the operator, by which the tool may be brought into the desired position over the molding-box for the smoothing operation. This form of smoothing-tool preferably has a cross-shaped section, as shown in Fig. 4, and comprises a plurality of bars $p^3$, one of which may be flat or smooth and the remainder provided with various profiles $p^4$. With this machine having a single strickle the plastic material may be first compressed with the smooth surface of the strickle and then shaped or molded with any of the profiled surfaces, according to requirements. Instead of using the smooth surface of the tool the latter may be inclined and the edge thereof used for cutting off the excess material in place of rubbing off same, as shown in Fig. 5.

What I claim as my invention, and desire to secure by Letters Patent of the United States, is—

1. The combination of a molding-table, guides connected therewith, a yoke adapted to have sliding and rotary movement in said guides, bars connected to said yoke and a strickle attached to said bars, the latter being located in a plane not below the operative surface of said strickle substantially as described.

2. The combination of a molding-table, guides connected therewith, a yoke adapted to have sliding and rotary movement in said guides, bars connected to said yoke and a strickle mounted on said bars and capable of rotation about its longitudinal axis, the bars aforesaid being located in a plane not below the operative surface of said strickle, substantially as described.

3. The combination of a molding-table, guides connected therewith, a yoke adapted to have sliding and rotary movement in said guides, bars connected to said yoke and a strickle having extended pivots rotatably mounted in said bars and serving as handles, the bars aforesaid being located in a plane not below the operative surface of said strickle substantially as described.

4. The combination of a molding-table, guides connected therewith, a yoke adapted to have sliding and rotary movement in said guides, bars connected to said yoke, and a strickle rotatably mounted in said bars and having a cross-shaped section, the bars aforesaid being located in a plane not below the operative surface of said strickle.

5. The combination of a molding-table, guides connected therewith, a yoke adapted to have sliding and rotary movement in said guides, bars connected to said yoke and a strickle of cross-shaped section rotatably mounted in said bars and having a smooth and variously-profiled surface, the bars aforesaid being located in a plane not below the operative surface of said strickle, substantially as described.

In witness whereof I have signed this specification in the presence of two witnesses.

ALFRED GASPARY.

Witnesses:
RUDOLPH FRICKE,
HERMANN KAISER.